(12) United States Patent
Goossen et al.

(10) Patent No.: US 10,593,010 B2
(45) Date of Patent: Mar. 17, 2020

(54) TECHNIQUES FOR CAPTURING AND EXECUTING GRAPHICS PROCESSING OPERATIONS

(71) Applicant: Microsoft Technology Licensing, LLC, Redmond, WA (US)

(72) Inventors: James Andrew Goossen, Sammamish, WA (US); Michael Alan Dougherty, Issaquah, WA (US); Cole James Brooking, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 15/840,658

(22) Filed: Dec. 13, 2017

(65) Prior Publication Data
US 2019/0180407 A1    Jun. 13, 2019

(51) Int. Cl.
| | |
|---|---|
| *G06T 1/60* | (2006.01) |
| *G06T 1/20* | (2006.01) |
| *G06F 12/14* | (2006.01) |
| *G06F 11/36* | (2006.01) |
| *G06F 11/34* | (2006.01) |

(52) U.S. Cl.
CPC ............ *G06T 1/20* (2013.01); *G06F 11/3414* (2013.01); *G06F 11/3466* (2013.01); *G06F 11/3471* (2013.01); *G06F 11/3636* (2013.01); *G06F 12/14* (2013.01); *G06T 1/60* (2013.01)

(58) Field of Classification Search
CPC .............. G06T 1/20; G06T 1/60; G06F 12/14
See application file for complete search history.

(56) References Cited

U.S. PATENT DOCUMENTS

| | | | |
|---|---|---|---|
| 5,664,161 A * | 9/1997 | Fukushima | ............... G06T 1/20 345/538 |
| 7,511,712 B1 | 3/2009 | Johns et al. | |
| 7,533,371 B1 * | 5/2009 | Johns | ................... G06F 11/323 345/419 |
| 8,935,671 B2 | 1/2015 | Sowerby et al. | |
| 2001/0056341 A1 * | 12/2001 | Pennello | ............. G06F 11/3636 703/22 |

(Continued)

OTHER PUBLICATIONS

Braak, et al., "Compile-time GPU Memory Access Optimizations", In Proceedings of International Conference on Embedded Computer Systems, Jul. 1, 2010, 8 Pages.

(Continued)

*Primary Examiner* — Diane M Wills
(74) *Attorney, Agent, or Firm* — Arent Fox LLP

(57) ABSTRACT

Examples described herein generally relate to capturing and executing graphics processing operations. A memory trap function can be activated to cause a graphics processing unit (GPU) to report memory accesses in executing graphics processing operations. Based on activating the memory trap function and for each of a sequence of executed graphics processing operations executed by the GPU, a sequence of memory accessing commands and associated portions of memory modified based on executing the sequence of executed graphics processing operations can be received. Each of the sequence of multiple memory accessing commands and associated portions of memory can be stored and provided to the GPU to emulate re-executing of the sequence of executed graphics processing operations by the GPU.

21 Claims, 6 Drawing Sheets

(56) References Cited

U.S. PATENT DOCUMENTS

| | | | | |
|---|---|---|---|---|
| 2005/0168472 A1* | 8/2005 | Gosalia | ............... | G06F 3/14 |
| | | | | 345/543 |
| 2011/0084964 A1* | 4/2011 | Gould | ............... | G06T 15/005 |
| | | | | 345/426 |
| 2016/0179714 A1* | 6/2016 | Acharya | ............... | G06F 12/023 |
| | | | | 711/158 |
| 2017/0329623 A1* | 11/2017 | Dong | ............... | G06F 9/45558 |

OTHER PUBLICATIONS

Hou, et al., "Debugging GPU Stream Programs Through Automatic Data Flow Recording and Visualization", In Proceedings of the ACM Transactions on Graphics, Dec. 1, 2009, 12 Pages.

Kirk, et al., "NVIDIA Cuda Software and GPU 1-15 Parallel Computing Architecture", In Proceedings of the 6th International Symposium on Memory management, Oct. 21, 2007, 64 Pages.

"International Search Report & Written Opinion for PCT Application No. PCT/US2018/062385", dated May 23, 2019, 14 Pages.

Sembrant, et al., "A Graphics Tracing Framework for Exploring CPU+GPU memory systems", In Proceedings of IEEE International Symposium On Workload Characterization, Oct. 1, 2017, 12 Pages.

* cited by examiner

TECHNIQUES FOR CAPTURING AND EXECUTING GRAPHICS PROCESSING OPERATIONS

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Applications are available for playing back, or re-executing, rendering instructions sent to the GPU. For example, such applications can capture graphics processing operations sent to the GPU, by a central processing unit (CPU), analyze the graphics processing operations to determine memory modified by the GPU in executing the graphics processing operations, and accordingly store the graphics processing operations sent to the GPU and the determined modified memory.

Subsequently, the application can playback the graphics processing operations by rebuilding the memory based on the determined modified memory, and sending the stored graphics processing operations back to the GPU for execution. This process can be useful in debugging graphics operations or otherwise evaluating the GPU performance based on modifying operating parameters, etc. This process, however, can also be time consuming and proprietary in requiring the CPU to analyze each possible GPU graphics processing operation.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for capturing and executing graphics processing operations is provided. The method includes activating a memory trap function to cause a graphics processing unit (GPU) to report memory accesses in executing graphics processing operations, receiving, based on activating the memory trap function and for each of a sequence of executed graphics processing operations executed by the GPU, a sequence of memory accessing commands and associated portions of memory modified based on executing the sequence of executed graphics processing operations, storing, in a repository, each of the sequence of multiple memory accessing commands and associated portions of memory, and providing, to the GPU, at least a portion of the sequence of multiple memory accessing commands and associated portions of memory to emulate re-executing of the sequence of executed graphics processing operations by the GPU.

In another example, a computing device for capturing and executing graphics processing operations is provided. The computing device includes a memory storing one or more parameters or instructions for executing an operating system and one or more applications, a display interface configured for communicating signals to display images on a display, and at least one processor coupled to the memory and the display interface. The at least one processor is configured to activate a memory trap function to cause a GPU to report memory accesses in executing graphics processing operations, receive, based on activating the memory trap function and for each of a sequence of executed graphics processing operations executed by the GPU, a sequence of memory accessing commands and associated portions of memory modified based on executing the sequence of executed graphics processing operations, store, in a repository, each of the sequence of multiple memory accessing commands and associated portions of memory, and provide, to the GPU, at least a portion of the sequence of multiple memory accessing commands and associated portions of memory to emulate re-executing of the sequence of executed graphics processing operations by the GPU.

In another example, a computer-readable medium, including code executable by one or more processors for capturing and executing graphics processing operations is provided. The code includes code for activating a memory trap function to cause a GPU to report memory accesses in executing graphics processing operations, receiving, based on activating the memory trap function and for each of a sequence of executed graphics processing operations executed by the GPU, a sequence of memory accessing commands and associated portions of memory modified based on executing the sequence of executed graphics processing operations, storing, in a repository, each of the sequence of multiple memory accessing commands and associated portions of memory, and providing, to the GPU, at least a portion of the sequence of multiple memory accessing commands and associated portions of memory to emulate re-executing of the sequence of executed graphics processing operations by the GPU.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
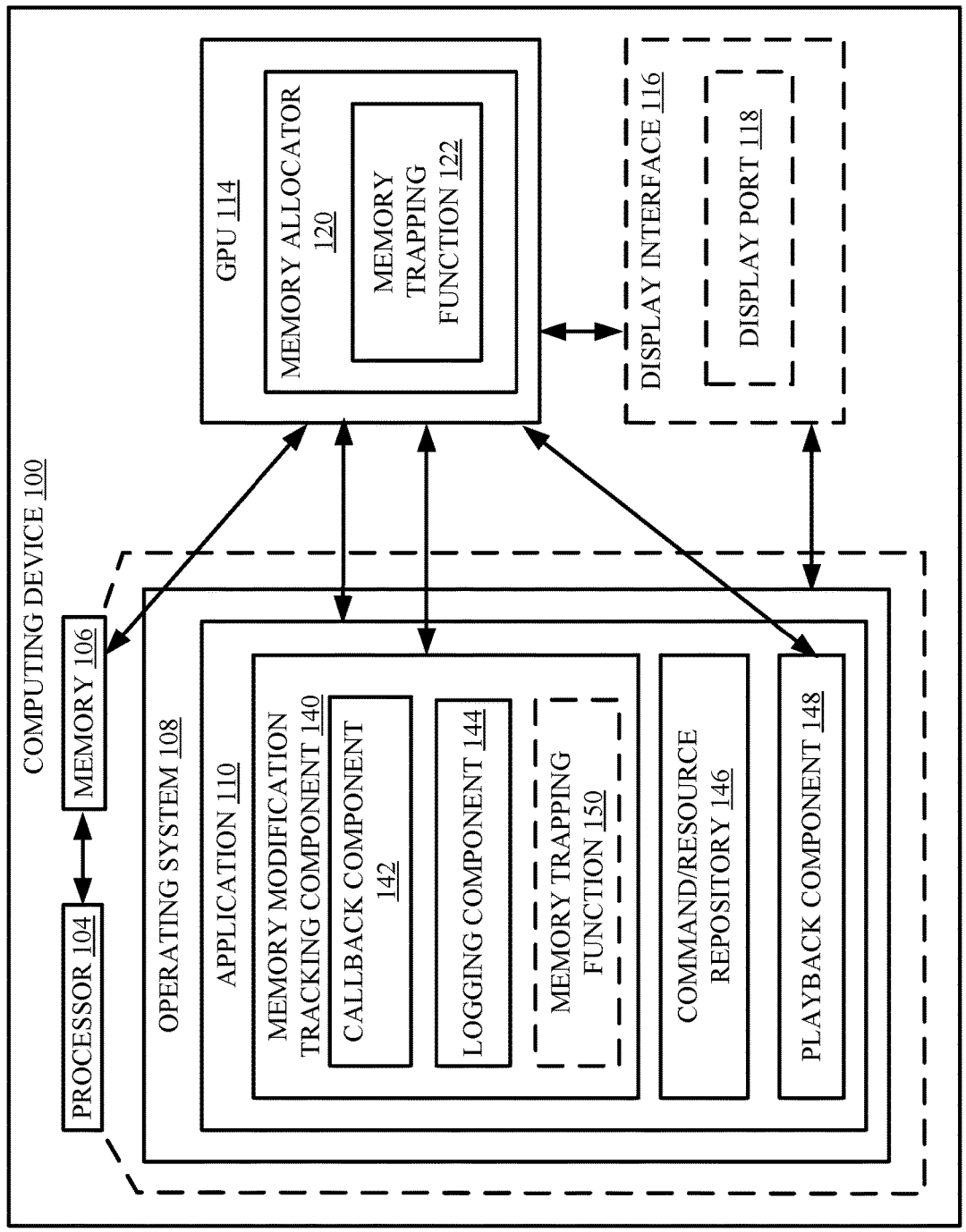
FIG. 1 is a schematic diagram of an example of a computing device for displaying images and capturing graphics procession operations in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to capturing and executing graphics processing operations. A memory trapping function can be enabled to facilitate reporting of memory modifications by a graphics processing unit (GPU). The memory trapping function can determine when portions of memory are modified, and for a given portion of memory can report at least the occurrence of the modification. In one example, each portion of memory may include an indicator specifying whether to enable trapping for the portion of memory, and the memory trapping function can determine to report modification of the memory based on the indicator. For example, the memory trapping function can be implemented in a memory allocator of the GPU, and can notify a central processing unit (CPU) (e.g., via an interrupt handler) when memory is modified by a graphics processing operation performed by the GPU. The CPU can accordingly store memory accessing commands and the associated modified memory in a repository for subsequently playing back the memory accessing commands to emulate the graphics processing operations.

Performing the memory trapping function and notification at the GPU can provide a fast and robust mechanism to capture the GPU processing operations, or at least modifications to memory that occur as a result of the GPU operations, as opposed to using the CPU to analyze rendering instructions sent to the GPU. For example, using the CPU to analyze GPU processing operations as they are sent to the GPU may require complex logic on the CPU to interpret each GPU processing operation, and may also require modification to accommodate new GPU commands. Using memory trapping at the GPU, however, can be performed more efficiently and may allow for capturing memory modifications in real time (or near real time).

Turning now to FIGS. 1-6, examples are depicted with reference to one or more components and one or more methods that may perform the actions or operations described herein, where components and/or actions/operations in dashed line may be optional. Although the operations described below in FIG. 2-5 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for rendering images, which can be displayed on a display device (not shown). For example, computing device 100 can include or can otherwise be coupled with a processor 104 and/or memory 106, where the processor 104 and/or memory 106 can be configured to execute or store instructions or other parameters related to generating rendering instructions for rendering images for displaying, as described herein. Computing device 100 can execute an operating system 108 (e.g., via processor 104 and/or memory 106) for providing an environment for executing one or more applications 110, such as one or more applications 110 that produce or otherwise obtain images for display. The application 110 can include substantially any application that generates streams of images for displaying at a frame rate, such as a game, a video streaming service, etc., for example. The computing device 100 can also include a GPU 114 for processing rendering instructions, and/or communicating associated commands to a display interface 116 to cause display of one or more images on a display, which may be coupled to the computing device 100 via a display port.

In an example, display interface 116 can be communicatively coupled with the processor 104 and/or memory 106 for communicating with a display via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116.

In an example, GPU 114 can include a memory allocator 120 for allocating portions of memory (e.g., memory 106) for use in executing graphics processing operations. For example, the memory allocator 120 may request portions of memory from a memory controller associated with memory 106, such as to obtain physical memory corresponding to virtual memory addresses specified to the GPU 114 for performing graphics processing operations. The memory allocator 120 can also include a memory trapping function 122 for detecting and reporting when portions of memory 106 are modified by the GPU 114. For example, the memory trapping function 122 can provide an indication of the portion of memory modified (e.g., at one or more levels of granularity, such as a page of memory, which may be of a configured size, a byte of memory, etc.) and/or an indication of a memory accessing command (e.g., read, write, etc.). In addition, memory trapping function 122 may provide a mechanism for activating the memory trapping and for specifying a callback function, interrupt handler or channel, etc. for the memory trapping function 122 to instantiate when memory modification is detected.

Application 110 can include a memory modification tracking component 140 for activating the memory trapping function 122 and/or tracking memory modifications reported by the GPU 114. The memory modification tracking component 140 can include a callback component 142, which may be the callback function, interrupt handler or channel, etc., and may be specified when activating the memory trapping function 122, and a logging component 144 for logging, in a command/resource repository 146, memory accessing commands and related memory resources reported by the memory trapping function 122. The command/resource repository 146 can include substantially any data storage mechanism in the computing device 100, such as memory 106, a hard drive, database, file, etc. In addition, the application 110 may optionally include a memory trapping function 150 for capturing modifications to memory 106 performed by the processor 104 (e.g., within the context of the application or otherwise). In this example, application 110 may also register the callback component 142 (or another callback component 142) with memory trapping function 150 for detecting and/or reporting memory modification performed by the processor 104. For example, portions of memory 106 assigned to memory allocator 120 can be marked for trapping functionality, as described herein, and memory trapping function 122 and/or memory trapping function 150 can respectively detect and/or report memory modifications made to the portions of memory 106 by the GPU 114 or processor 104.

Application 110 can further include a playback component 148 for emulating re-execution of the graphics processing operations based on the memory accessing commands and corresponding memory resources stored in the command/resource repository 146. In one example, playback component 148 can allow for modifying settings of the GPU 114, modifying portions of the commands, etc. to debug or evaluate performance during re-execution of the graphics processing operations. In another example, playback component 148 can generate the graphics processing operations based on the memory accessing commands and associated modified memory resources to playback the graphics processing operations. In any case, at least the capture and storage of graphics processing operations, or data for recreating the graphics processing operations, can occur efficiently by using the memory trapping function 122 in the GPU 114.

Figure 2:
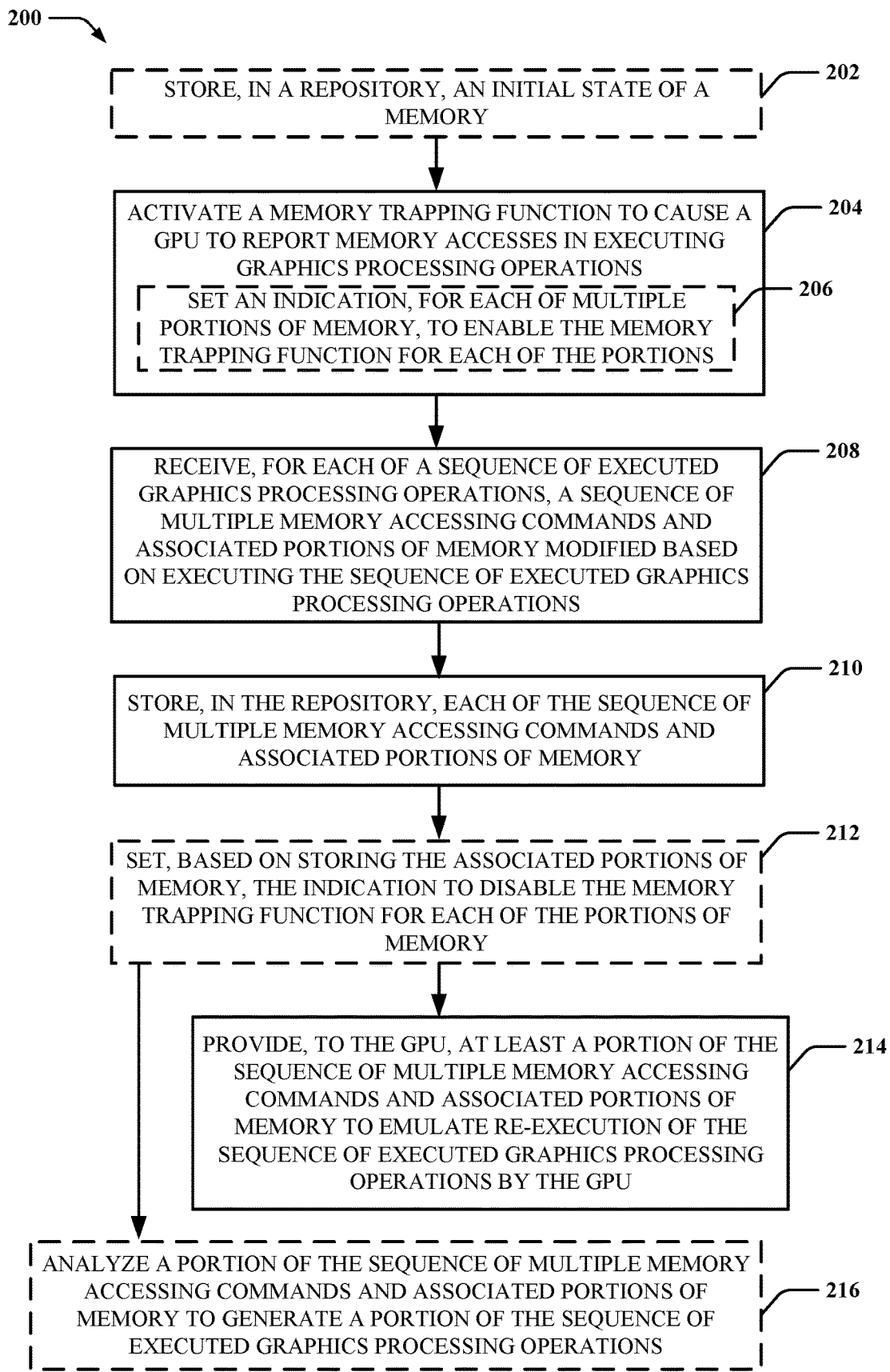
FIG. 2 is a flow diagram of an example of a method for capturing and providing memory accessing commands associated with graphics processing operations in accordance with examples described herein.

FIG. 2 is a flowchart of an example of a method 200 for efficiently and robustly capturing and re-executing graphics processing operations. For example, method 200 can be performed by a computing device 100, and is accordingly described with reference to FIG. 1, as a non-limiting example of an environment for carrying out method 200.

In method 200, optionally at action 202, an initial state of a memory is stored in a repository. In an example, memory modification tracking component 140, e.g., in conjunction with processor 104, memory 106, etc., can store, in the repository (e.g., command/resource repository 146), an initial state of the memory (e.g., memory 106 and/or a portion thereof). For example, memory modification tracking component 140 can store the initial state of a portion of memory 106 dedicated to GPU 114 and/or to a corresponding set of graphics processing operations, such to track modification of the memory based on performance of the graphics processing operations. For example, where the GPU 114 operates at a memory page granularity (e.g., 4 kilobyte (KB) pages, 16 KB pages, 4 megabyte (MB) pages, etc.), memory modification tracking component 140 can store an initial state of multiple pages of memory 106 related to performing graphics processing operations.

At action 204, a memory trapping function can be activated to cause a GPU to report memory accesses in executing graphics processing operations. In an example, memory modification tracking component 140, e.g., in conjunction with processor 104, memory 106, etc., can activate the memory trapping function (e.g., memory trapping function 122 on the GPU 114) to cause the GPU (e.g., GPU 114) to report memory accesses in executing graphics processing operations. For example, memory modification tracking component 140 can activate the memory trapping function via a function call to the GPU 114. Memory modification tracking component 140 may include a handle or other identifier of the callback component 142 in the activation request/command send to the GPU 114 to allow the memory trapping function 122 to call the callback component 142 when memory modification is detected. In addition, for example, memory modification tracking component 140 may indicate portions of memory (e.g., pages) for which to activate the memory trapping function 122, and/or GPU 114 can activate the memory trapping function 122 on the specified portions or otherwise on all portion relevant to the graphics processing operations.

In another example, the processor 104 (e.g., via application 110 or another application) can also execute graphics processing operations that result in modifying portions of memory 106. In this example, a memory trapping function, not shown, can also be activated for the processor (e.g., CPU) 104. In one example, memory trapping function 122 may be able to detect modification of the memory 106 regardless of whether GPU 114 or processor 104 modifies the memory, and can act as a memory trapping function for both operations.

In an example, activating the memory trapping function at action 204 may optionally include, at action 206, setting an indication, for each of multiple portions of memory, to enable the memory trapping function for each of the portions. For example, each portion of memory may have an associated bit or other indicator specifying whether memory trapping is enabled for the portion of memory. Memory modification tracking component 140 and/or GPU 114 may set the bit or other indicator for a set of portions (e.g., pages) relevant to the graphics processing operations or for specific portions that may be indicated when activating the memory trapping function 122.

At action 208, for each of a sequence of executed graphics processing operations, a sequence of multiple memory accessing commands and associated portions of memory modified based executing the sequence of executed graphics processing operations can be received. In an example, memory modification tracking component 140, e.g., in conjunction with processor 104, memory 106, etc., can receive, for each of the sequence of executed graphics processing operations, the sequence of multiple memory accessing commands and associated portions of memory modified based on executing the sequence of executed graphics processing operations. For example, the application 110, and/or another application, processor, etc., can provide graphics processing operations to the GPU 114 (e.g., as a set of rendering instructions) to facilitate rendering of graphics for display. For example, the GPU 114 can be designed to efficiently process graphics processing operations concurrently with (e.g., separately from) CPU operations.

The GPU 114 can accordingly perform the graphics processing operations, and for each memory modification (e.g., where a bit indicator for an associated portion of memory is set), the memory trapping function 122 can callback to the memory modification tracking component 140 via the specified callback component 142. The callback may include an indication of the portion (e.g. page) of memory modified by the GPU in performing the graphics processing operation and one or more associated memory accessing commands (e.g., read, write, etc.). Thus, for example, memory modification tracking component 140 can receive an indication of the portion of memory modified and the corresponding memory accessing command(s) via the callback component 142. For example, memory modification tracking component 140 can receive the indications of the portion of memory modified by the GPU and the one or more associated memory accessing commands corresponding to the graphics processing operations as each operation is performed (e.g., a callback can occur for each graphics processing operation). This can allow for storing copies of the portions of memory and the associated memory accessing commands in sequence, in one example. In other examples, the processor 104 may execute graphics processing operations as well, for which memory trapping can be performed, as described above, for reporting memory accessing commands and/or associated portions of memory (e.g., via callback component 142 or another registered callback).

At action 210, each of the sequence of multiple memory accessing commands and associated portions of memory can be stored in the repository. In an example, logging component 144, e.g., in conjunction with processor 104, memory 106, memory modification tracking component 140, etc., can store, in the repository (e.g., command/resource repository 146), each of the sequence of multiple memory accessing commands and associated portions of memory. For example, logging component 144 can store the memory accessing commands performed (e.g., by the GPU 114) in executing the graphics processing operations (e.g., read, write, etc.) and copies of the associated portions of memory (e.g., pages of memory 106) affected by the memory accessing commands in the command/resource repository 146. This can allow for emulating playback of the graphics processing operations, as described further herein, by providing the memory accessing commands and/or relevant portions of memory to the GPU 114 for re-execution. Moreover, for example, the GPU 114 may block processing of graphics processing operations based on the callback to allow the application 110 to copy the portion of the memory without conflict, and memory modification tracking component 140 can accordingly notify the GPU 114 once storing is completed (e.g., by setting a register on the GPU based on completion of the storing) to allow the GPU 114 to unblock and continue processing of the graphics processing operations.

Additionally, optionally at action 212, the indication to disable the memory trapping function for each of the portions of memory can be set based on storing the associated portions of memory. In an example, memory modification tracking component 140, e.g., in conjunction with processor 104, memory 106, etc., can set, based on storing the associated portions of memory, the indication to disable the memory trapping function for each of the portions of memory. In this example, the memory trapping function 122 need not determine whether these portions of memory are modified in subsequent graphics processing operations. In some examples described further herein, however, the CPU may also execute graphics processing operations or modify resources used by the GPU, and have an associated memory trapping function. In this example, the memory modification tracking component 140 (e.g., based on a callback from a memory trapping function 150 executing on the processor 104, e.g., via the application 110) can enable a memory trapping function on the CPU (e.g., on processor 104) where the CPU modifies the portion of the memory in performing graphics processing operations. Accordingly, such modifications by the CPU can also be captured and reported using callback component 142 (or another callback component registered with the memory trapping function 150).

At action 214, at least a portion of the sequence of multiple memory accessing commands and associated portions of memory can be provided to the GPU to emulate re-execution of the sequence of executed graphics processing operations by the GPU. In an example, playback component 148, e.g., in conjunction with processor 104, memory 106, etc., can provide, to the GPU (e.g., GPU 114), at least the portion of the sequence of multiple memory accessing commands and associated portions of memory to emulate re-execution of the sequence of executed graphics processing operations by the GPU 114. For example, this can allow for efficient playback of the GPU processing operations, or at least the corresponding modifications to memory, for debugging, evaluating GPU 114 performance, etc. Playback component 148 can also provide the initial state of the memory to the GPU 114 as a starting point for executing the multiple memory accessing commands on the associated portions of memory to emulate re-execution of the sequence of executed graphics processing operations. Additionally, as described further herein, GPU settings, graphics processing operation parameters, etc. can be modified in playing back the GPU processing operations to evaluate how the modifications may impact GPU 114 performance.

Optionally, at action 216 (e.g., in addition or alternatively to providing the memory accessing commands and associated portions of memory to the GPU), a portion of the sequence of multiple memory accessing commands and associated portions of memory can be analyzed to generate a portion of the sequence of executed graphics processing operations. In an example, playback component 148, e.g., in conjunction with processor 104, memory 106, etc., can analyze the portion of the sequence of multiple memory accessing commands and associated portions of memory to generate a portion of the sequence of executed graphics processing operations. For example, an ordering of the memory accessing commands may be indicative of certain GPU graphics processing operations, and the portions of memory can indicate on which portions (e.g., pages) of memory the graphics processing operations are performed. Thus, the sequence of executed graphics processing operations can be reconstructed for playing back on the GPU 114 as a set of graphics processing operations (e.g., as opposed or in addition to the explicit memory accesses).

Figure 3:
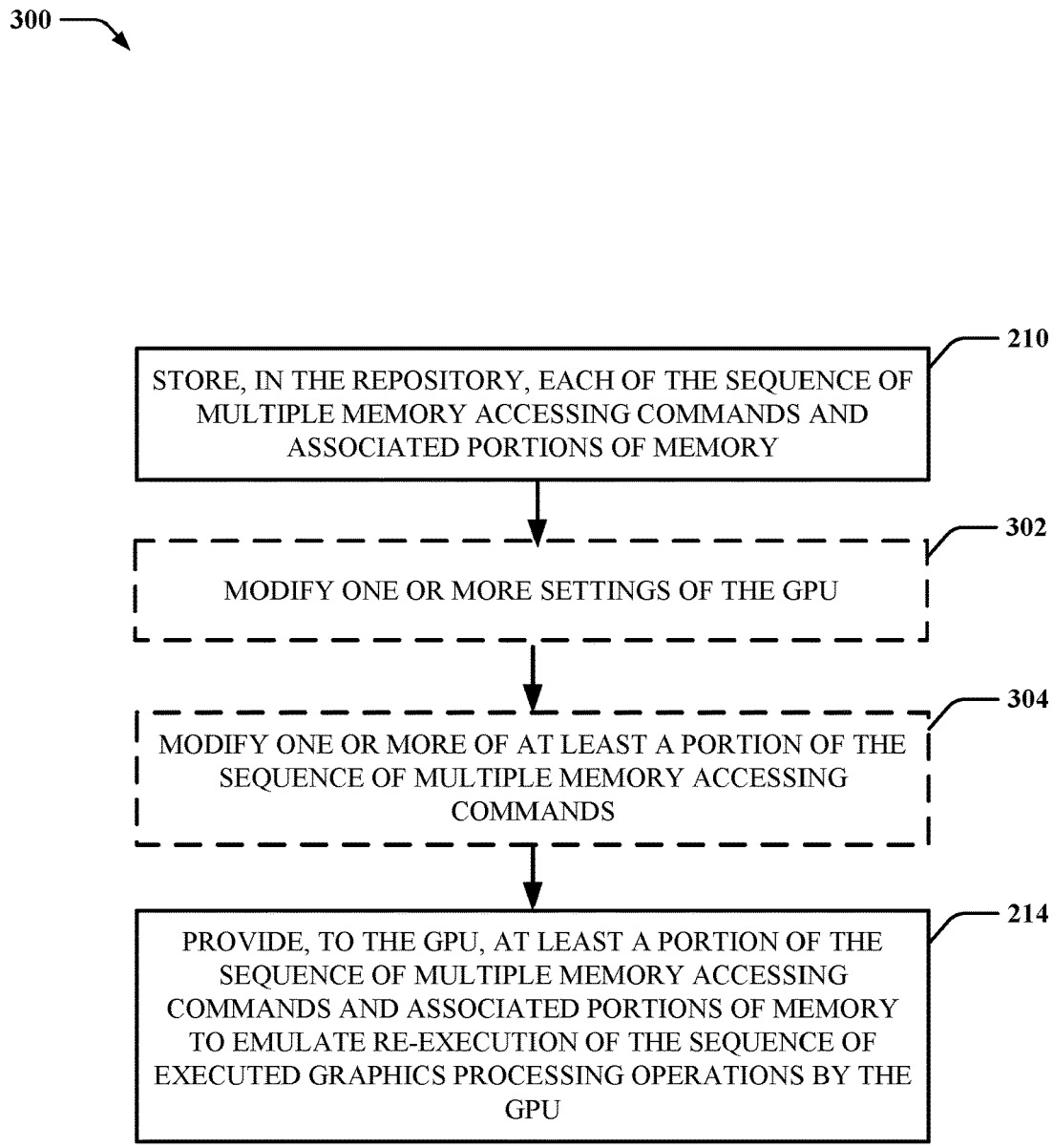
FIG. 3 is a flow diagram of an example of a method for playing back memory accessing commands associated with graphics processing operations in accordance with examples described herein.

FIG. 3 is a flowchart of an example of a method 300 for playing back or emulating playback of graphics processing operations. For example, method 300 can be performed by a computing device 100, and is accordingly described with reference to FIG. 1, as a non-limiting example of an environment for carrying out method 300.

In method 300, at action 210, each of the sequence of multiple memory accessing commands and associated portions of memory can be stored in the repository. In an example, logging component 144, e.g., in conjunction with processor 104, memory 106, memory modification tracking component 140, etc., can store, in the repository (e.g., command/resource repository 146), each of the sequence of multiple memory accessing commands and associated portions of memory, as described previously in reference to FIG. 2. In addition, one or more of the actions described in FIG. 2 can occur to obtain the sequence of multiple memory accessing commands and associated portions of memory for storing in the repository. As described herein, one or more modifications can be made before playback to test performance of the GPU 114 in certain situations.

Optionally, at action 302, one or more settings of the GPU can be modified. In an example, playback component 148, e.g., in conjunction with processor 104, memory 106, etc., can modify one or more settings of the GPU. For example, playback component 148 can modify a cache behavior of the GPU 114, a page size used by the GPU 114, etc.

Optionally, at action 304, one or more of at least a portion of the sequence of multiple memory accessing commands may be modified. In an example, playback component 148, e.g., in conjunction with processor 104, memory 106, etc., can modify the one or more of at least the portion of the sequence of multiple memory accessing commands. For example, playback component 148 can modify the memory accessing commands to correspond to different graphics processing operations, to perform different memory accessing commands, etc. such as to evaluate the performance of the GPU 114 in response. In another example, where the graphics processing operations are rebuilt based on the memory accessing commands and associated portions of memory, playback component 148 can modify one or more parameters of the graphics processing operations in this regard before playback.

At action 214, at least a portion of the sequence of multiple memory accessing commands and associated portions of memory can be provided to the GPU to emulate re-execution of the sequence of executed graphics processing operations by the GPU. In an example, playback component 148, e.g., in conjunction with processor 104, memory 106, etc., can provide, to the GPU (e.g., GPU 114), at least the portion of the sequence of multiple memory accessing commands and associated portions of memory to emulate re-execution of the sequence of executed graphics processing operations by the GPU 114. For example, playback component 148 can provide the information to emulate the re-execution after modifying the one or more settings or memory accessing commands to allow for debugging, evaluating performance of the GPU 114, etc.

Figure 4:
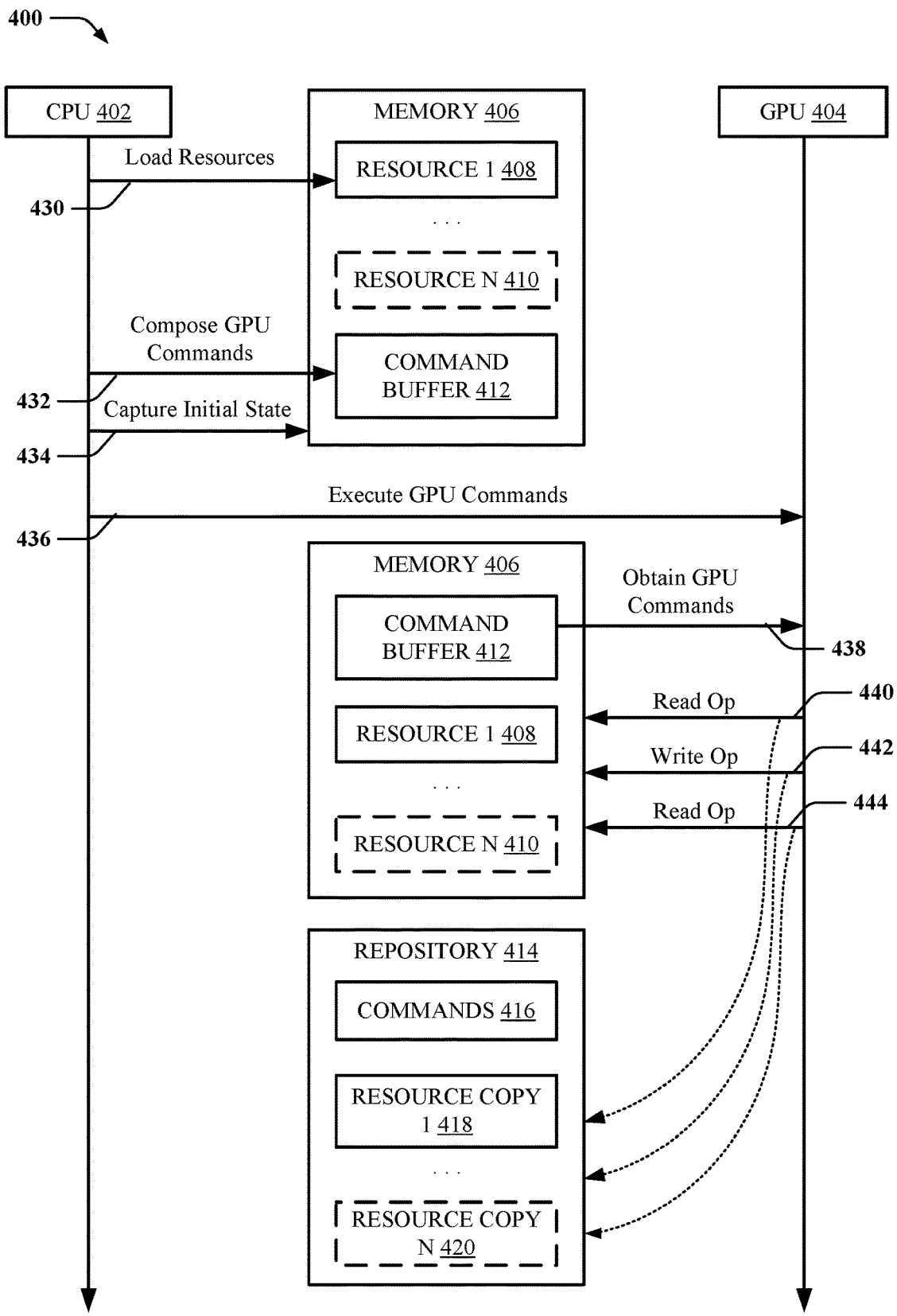
FIG. 4 illustrates a schematic diagram of an example of a communication flow for capturing memory accessing commands associated with graphics processing operations in accordance with examples described herein.

FIG. 4 illustrates an example of a communication flow 400 for a system for capturing graphics processing operations, or at least related memory modification, in a repository in accordance with examples described herein. A CPU 402 is shown, which may correspond to processor 104 (in FIG. 1), and a GPU 404, which can correspond to GPU 114, where the CPU 402 and GPU 404 can communicate with one another to perform graphics processing operations. A memory 406 is also shown, which may correspond to memory 106 and which the CPU 402 and/or GPU 404 can access in performing the graphics processing operations. For example, the memory 406 can store one or more resources, which can correspond to the portions (e.g., pages) of memory described herein, including resource 1 408, . . . resource N 410. Memory 406 can also include a command buffer 412 for storing GPU commands for performing graphics processing operations on the GPU 404. In addition, a repository 414 is shown for storing memory accessing commands 416 and copies of memory resources, such as resource copy 1 418, . . . resource copy N 420, as described herein.

The CPU 402 can load memory resources into memory 406 at 430. For example, CPU 402 can load memory for performing a set of graphics processing operations, such as one or more pages or other portions of memory for the graphics processing operations, which may include resource 1 408, . . . resource N 410. The CPU 402 can also compose GPU commands for performing the graphics processing operations, which may include rendering instructions for rendering images to display, at 432. The GPU commands can be stored in a command buffer 412 in memory 406. The CPU 402 may additionally capture an initial state of the memory (e.g., of the loaded resources, such as resource 1 408, . . . resource N 410), which can be stored in the repository 414.

The CPU 402 can instruct the GPU 404 to execute GPU commands at 436, which can include providing a handle, pointer, or other information regarding the command buffer 412, corresponding resources (e.g., resource 1 408, . . . resource N 410, etc.). The GPU 404 can accordingly obtain GPU commands from the command buffer 412 in memory 406 at 438. The GPU 404 can then execute the GPU commands, which result in performing memory accesses. Such as read operation 440, write operation 442, and read operation 444. Where memory trapping is activated for the GPU 404, as described, the read operation 440, write operation 442, and read operation 444 can also be copied into the repository 414, which can include copying the commands themselves (or an indication thereof) in commands 416 and a copy of the impacted portion of memory as resource copy 1 418, . . . resource copy N 420.

For example, where the memory trapping is at the page level, executing the read operation 440, write operation 442, and read operation 444 can result in storing the page(s) of memory impacted by each operation, as described above. As described, this may include the GPU 404 calling back a callback function on the CPU 402 when the associated resource 408, 410 is modified, and the CPU 402 can store the associated command(s) 416 and/or the corresponding resource copies 418, 420 in the repository 414. In another example, the CPU 402 can build a table of the resources as they are created (e.g., allocated to the GPU 404), and then use the trapped page addresses from the callback function, instantiated by the GPU 404 when the resource is modified, to look up the memory ranges for the entirety of modified resources. Then, in this example, the CPU 402 can capture, and write to the repository 414, the memory ranges corresponding to the entirety of modified resources. Once stored in the repository, the commands can be played back from the initial state to emulate re-execution of the graphics processing operations.

Figure 5:
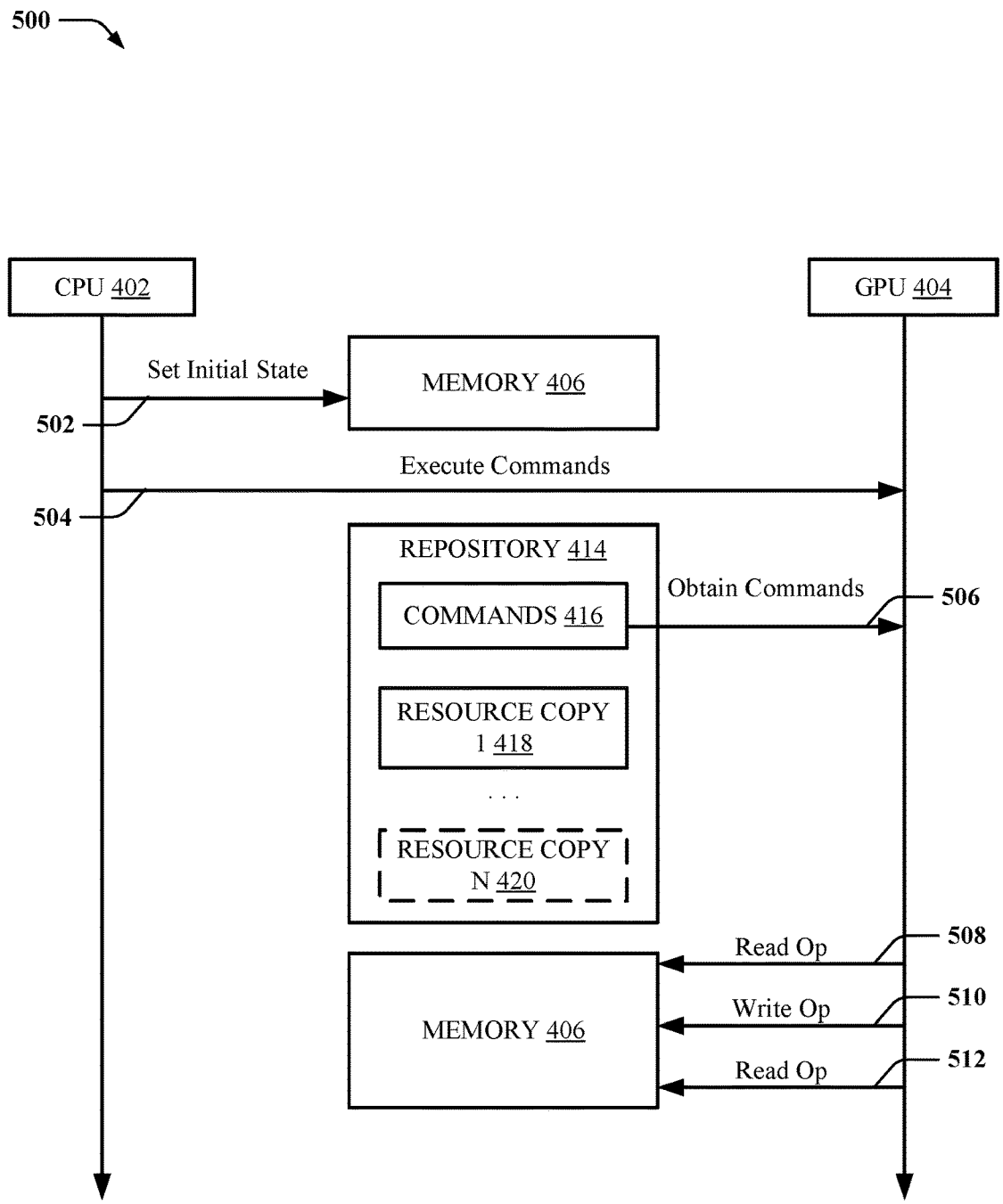
FIG. 5 illustrates a schematic diagram of an example of a communication flow for playing back memory accessing commands associated with graphics processing operations in accordance with examples described herein.

FIG. 5 illustrates an example of a communication flow 500 for a system for playing back graphics processing operations, or at least related memory modification, in accordance with examples described herein. A CPU 402 is shown, which may correspond to processor 104 (in FIG. 1), and a GPU 404, which can correspond to GPU 114, where the CPU 402 and GPU 404 can communicate with one another to perform graphics processing operations. A memory 406 is also shown, which may correspond to memory 106 and which the CPU 402 and/or GPU 404 can access in performing the graphics processing operations. In addition, a repository 414 is shown for storing memory accessing commands 416 and copies of memory resources, such as resource copy 1 418, . . . resource copy N 420, as described herein. As described above, the repository can have been generated to include various memory accessing commands from a sequence of graphics processing operations and/or related copies of memory resources.

The CPU 402 can set an initial state for memory 406 at 502, which can correspond to an initial state captured before executing graphics processing operations, such as at 434 in FIG. 4. The CPU 402 can instruct the GPU 404 to execute memory accessing commands, corresponding to the previously executed graphics processing operations, at 504 such to emulate re-execution of the graphics processing operations. As described, one or more settings of the GPU 404, commands 416, etc. can be modified to debug and/or test performance of the GPU 114 in different states or environments. In this regard, GPU 404 can obtain the commands 416 and can begin executing the memory accessing commands, such as the read operation 508, write operation 510, and read operation 512, which can correspond to read operation 440, write operation 442, and read operation 444. For example, the GPU 404 can modify memory 406 based on the operations 508, 510, 512, and corresponding copies of memory resources (e.g., pages or other portions of memory), including resource copy 1 418, . . . resource copy N 420, etc. to emulate playback of the graphics processing operations.

Figure 6:
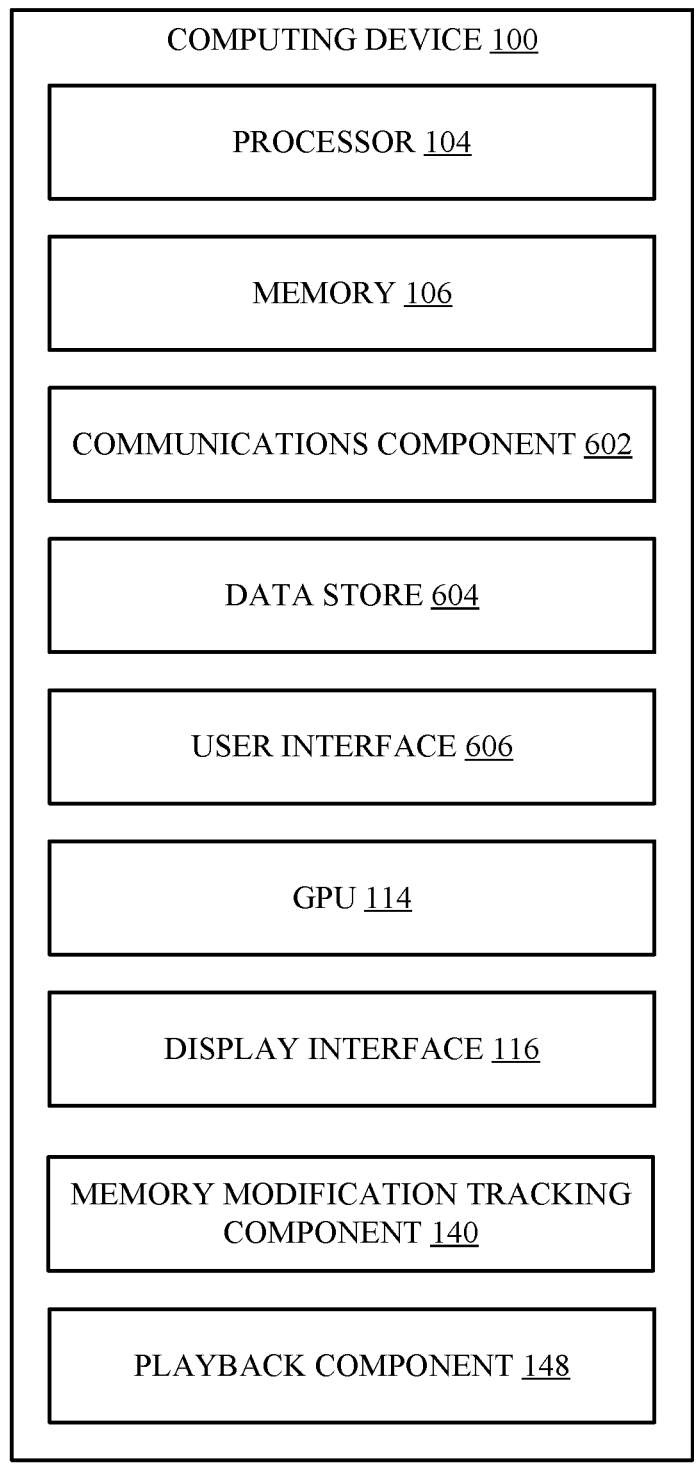
FIG. 6 is a schematic diagram of an example of a computing device for performing functions described herein.

FIG. 6 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 602 that provides for establishing and maintaining communications with one or more other devices, parties, entities, etc. utilizing hardware, software, and services as described herein. Communications component 602 may carry communications between components on computing device 100, as well as between computing device 100 and external devices, such as devices located across a communications network and/or devices serially or locally connected to computing device 100. For example, communications component 602 may include one or more buses, and may further include transmit chain components and receive chain components associated with a wireless or wired transmitter and receiver, respectively, operable for interfacing with external devices.

Additionally, computing device 100 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for an operating system, application, display driver, etc. executing on the processor 104, and/or one or more other components of the computing device 100.

Computing device 100 may also include a user interface component 606 operable to receive inputs from a user of computing device 100 and further operable to generate outputs for presentation to the user (e.g., via display interface 116 to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering images based on rendering instruction received from processor 104. GPU 114 can additional send signals via a display interface 116 to cause display of the rendered images on a display (not shown). Additionally, computing device 100 may include a memory modification tracking component 140, as described herein, to track and capture modification of memory (e.g., memory 106) caused by performing graphics processing operations. For example, memory modification tracking component 140 can store capture information in data store 604, as described herein, for subsequent playback. Computing device 100 may also include a playback component 148 for providing the capture information back to the GPU 114 to emulate re-execution of the graphics processing operations, as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for capturing and executing graphics processing operations, comprising:
    activating a memory trap function to cause a graphics processing unit (GPU) to report memory accesses in executing graphics processing, operations;
    receiving, based on activating the memory trap function and for each of a sequence of executed graphics processing operations executed by the GPU, a sequence of multiple memory accessing commands and associated portions of modified memory, wherein the associated portions of modified memory are modified from an initial state based on executing the sequence of executed graphics processing operations;
    storing, in a repository, each of the sequence of multiple memory accessing commands and associated portions of modified memory; and
    providing, to the GPU, at least a portion of the sequence of multiple memory accessing commands and associated portions of modified memory to emulate re-executing of the sequence of executed graphics processing operations by the GPU based on at least the portion of the sequence of multiple memory accessing commands.

2. The method of claim 1, wherein activating, the memory trap function comprises providing an interrupt channel to the GPU, wherein the sequence of multiple memory accessing commands and associated portions of memory are received over the interrupt channel.

3. The method of claim 2, wherein storing, in the repository, each of the sequence of multiple memory accessing commands and associated portions of memory includes setting a register on the GPU based on completion of the storing to allow the GPU to continue processing graphics processing operations.

4. The method of claim 1, wherein the portions of memory each correspond to a page of memory, and wherein activating the memory trap function comprises setting a bit for each page of the memory indicating whether to perform the memory trap function for the page of memory.

5. The method of claim 4, further comprising setting, based on storing each page of the memory, the bit for each page of the memory to indicating not to perform the memory trap function for the page of memory.

6. The method of claim 1, further comprising storing, in the repository, an initial state of the memory, and providing, to the GPU, the initial state of the memory in emulating the re-executing of the sequence of executed graphics processing operations.

7. The method of claim 1, further comprising modifying one or more settings of the GPU before providing, to the GPU, at least the portion of the sequence of multiple memory accessing commands and associated portions of memory in emulating the re-executing of the sequence of executed graphics processing operations based at least in part on the one or more settings as modified.

8. The method of claim 1, further comprising modifying one or more of at least the portion of the sequence of multiple memory accessing commands before providing at least the portion of the sequence of multiple memory accessing commands and associated portions of memory, in emulating the re-executing of the sequence of executed graphics processing operations including the one or more of at least the portion of the sequence of multiple memory accessing commands as modified.

9. The method of claim 1, further comprising analyzing a portion of the sequence of multiple memory accessing commands and associated portions of memory to generate a portion of the sequence of executed graphics processing operations.

10. The method of claim 1, further comprising:
    receiving, for each of a sequence of central processing unit (CPU)-executed graphics processing operations executed by a CPU, a sequence of multiple CPU memory accessing, commands and associated CPU portions of memory modified based on executing the sequence of CPU-executed graphics processing operations; and
    storing, in the repository, each of the sequence of multiple CPU memory accessing commands and associated CPU portions of memory.

11. The method of claim 1, further comprising:
    emulating-execution of the sequence of executed graphics processing operations using at least the portion of the sequence of multiple memory accessing commands and the associated portions of modified memory.

12. A computing device for capturing and executing graphics processing operations, comprising:
    a memory storing one or more parameters or instructions for executing an operating system and one or more applications;
    a display interface configured for communicating signals to display images, on a display; and
    at least one processor coupled to the memory and the display interface, wherein the at least one processor is configured to:
        activate a memory trap function to cause a graphics processing unit (GPU) to report memory accesses in executing graphics processing operations;
        receive, based on activating the memory trap function and for each of a sequence of executed graphics processing operations executed by the GPU, a sequence of multiple memory accessing commands and associated portions of modified memory, wherein the associated portions of modified memory are modified from an initial state based on executing the sequence of executed graphics processing operations;

store, in a repository, each of the sequence of multiple memory accessing commands and associated portions of modified memory; and provide, to the GPU, at least a portion of the sequence of multiple memory accessing commands and associated portions of modified memory to emulate re-executing of the sequence of executed graphics processing operations by the GPU based on at least the portion of the sequence of multiple memory accessing commands and the associated portions of modified memory.

13. The computing device of claim 12, wherein the at least one processor is configured, to activate the memory trap function at least in part by providing an interrupt channel to the GPU, wherein the sequence of multiple memory accessing commands and associated portions of memory are received over the interrupt channel.

14. The computing device of claim 12, wherein the portions of memory each correspond to a page of memory, and wherein the at least one processor is configured to activate the memory trap function at least in part by setting a bit for each page of the memory indicating whether to perform the memory trap function for the page of memory.

15. The computing device of claim 12, wherein the at least one processor is further configured to store, in the repository, an initial state of the memory, and provide, to the GPU, the initial state of the memory in emulating the re-executing of the sequence of executed graphics processing operations.

16. The computing device of claim 12, wherein the at least one processor is further configured to modify one or more settings of the GPU before providing, to the GPU, at least the portion of the sequence of multiple memory accessing commands and associated portions of memory in emulating the re-executing of the sequence of executed graphics processing operations based at least in part on the one or more settings as modified.

17. The computing device of claim 12, wherein the at least one processor is further configured to modify one or more of at least the portion of the sequence of multiple memory accessing commands before providing at least the portion of the sequence of multiple memory accessing commands and associated portions of memory, in emulating the re-executing of the sequence of executed graphics processing operations including the one or more of at least the portion of the sequence of multiple memory accessing commands as modified.

18. The computing device of claim 12, wherein the at least one processor is further configured to analyze a portion of the sequence of multiple memory accessing commands and associated portions of memory to generate a portion of the sequence of executed graphics processing operations.

19. A non-transitory computer-readable medium, comprising code executable by one or more processors for capturing and executing graphics processing operations, the code comprising code for:

activating a memory trap function to cause a graphics processing unit (GPU) to report memory accesses in executing graphics processing operations;

receiving, based on activating the memory trap function and for each of a sequence of executed graphics processing operations executed by the GPU, a sequence of multiple memory accessing commands and associated portions of modified memory, wherein the associated portions of modified memory are modified from an initial state based on executing the sequence of executed graphics processing operations;

storing, in a repository, each of the sequence of multiple memory accessing commands and associated portions of modified memory; and providing, to the GPU, at least a portion of the sequence of multiple memory accessing commands and associated portions of modified memory to emulate re-executing of the sequence of executed graphics processing operations by the GPU based on at least the portion of the sequence of multiple memory accessing commands and the associated portions of modified memory.

20. The non-transitory computer-readable medium of claim 19, wherein the code for activating the memory trap function comprises code for providing an interrupt channel to the GPU, wherein the sequence of multiple memory accessing commands and associated portions of memory are received over the interrupt channel.

21. The non-transitory computer-readable medium of claim 19, wherein the portions of memory each correspond to a page of memory, and wherein the code for activating the memory trap function comprises code for setting a bit for each page of the memory indicating whether to perform the memory trap function for the page of memory.

* * * * *